United States Patent Office 3,761,450
Patented Sept. 25, 1973

---

3,761,450
SALTS OF POLYCARBOXYLIC ACIDS AS NUCLEATING AGENTS IN POLYESTERS
Walter Herwig, Frankfurt am Main, and Günter Freund, Hofheim, Taunus, Germany, assignors to Farbwerke Hoechst Aktiengesellschaft vormals Meister Lucius & Bruning, Frankfurt am Main, Germany
No Drawing. Continuation of abandoned application Ser. No. 68,542, Aug. 31, 1970. This application July 3, 1972, Ser. No. 268,837
Claims priority, application Germany, Sept. 11, 1969, P 19 45 267.7
Int. Cl. C08g 39/04
U.S. Cl. 260—75 T                                  10 Claims

ABSTRACT OF THE DISCLOSURE

Molding compositions based on linear saturated polyesters and the lithium and/or sodium salts of polycarboxylic acids, which molding compositions may be worked up in the thermoplastic state and from which molded articles having a high dimensional stability can be made. In the manufacture of molded articles, already small amounts of the said salts bring about a high crystallinity in the heated mold after a short time.

---

This application is a continuation application of pending application Ser. No. 68,542 filed Aug. 31, 1970 and now abandoned.

The present invention relates to thermoplastic molding compositions based on saturated polyesters.

It has been proposed to work up thermoplastic molding compositions of linear saturated polyesters of aromatic dicarboxylic acids into molded articles by injection-molding or extrusion. It is also known that said molded articles possess valuable properties, such as dimensional stability under heat and hardness only when the molded articles have a sufficient degree of crystallinity.

To ensure that the polyester mass, on being worked up into molded articles in the heated mold, attains the desired crystallinity in a sufficiently short time, it has already been proposed to incorporate solid inorganic substances into the polyester mass as nucleating agents, such as metal oxides, salts of the alkaline-earth metals, talcum powder, glass powder or metals. The inorganic substances should have a grain size below 2 microns. However, an inorganic substance which is insoluble in the polyester, even when it has a very small particle size, normally brings about but an insufficient nucleation. A few definite substances are specifically more effective as nucleating agents.

Now we have found that a thermoplastic molding composition consisting essentially of a mixture (a) of a linear saturated polyester of an aromatic dicarboxylic acid and, optionally, up to 5% by weight, calculated on the total amount of the dicarboxylic acid, of an aliphatic dicarboxylic acid, with a saturated aliphatic or cycloaliphatic diol, and
(b) from 0.005 to 3% by weight, preferably 0.02 to 0.5% by weight, calculated on the polyester, of lithium and/or sodium salts of polycarboxylic acids, the particle size of the salts of the polycarboxylic acids being less than 10 microns, can be worked up with great advantage and in an economic manner into crystalline molded articles by injection-molding.

The special and unexpected action of the sodium or lithium salts of the polycarboxylic acids is that in the work-up of molding compositions of polyethylene terephthalate containing sodium or lithium salts of polycarboxylic acids, a sufficient crystallinity in the heated mold is attained already after a short time, even with the use of a much smaller amount of these salts than is the case with all hitherto tested inorganic solid materials.

As salts according to the invention there may be used the lithium and/or sodium salts of aliphatic, cycloaliphatic, aromatic or heterocyclic polycarboxylic acids containing up to 20 carbon atoms.

For the preparation of the polyester molding compositions of the invention there may be used, for example, the sodium- or lithium salts of the following acids: succinic acid, adipic acid, suberic acid, 1,10 - decanedicarboxylic acid, 1,4-cyclohexanedicarboxylic acid, terephthalic acid, 1,2,3-propanetricarboxylic acid, 1,3,5-cyclohexane-tricarboxylic acid, trimellitic acid, 1,2,3,4 - cyclopentane-tetracarboxylic acid or pyromellitic acid.

According to the invention, there may also be used mixtures of salts of the aforesaid acids with the said metals. The sodium salts of the said acids are used with special advantage.

The salts are preferably used in a pulverized form having a particle size of below 10 microns. The amount of the salts added to the polyester should be from 0.005 to 3%, preferably 0.02 to 0.5% by weight, calculated on the polyester employed.

The salts may be admixed to the polyester in various different ways. It is possible, for example, to mix the polyester granules and the salt with one another in the eccentric tumbling drier, which method brings about a uniform distribution of the salt on the surface of the granular grains. The thorough mixing process proper is then carried out by the screw of the injection-machine.

However, it is also possible that the granular product, which has been coated with the salt in the afore-described manner, is melted in the extruder and homogenized, then it is extruded into water and granulated. The material treated in this manner must then be dried and, if necessary, again be subjected to a post-condensation in the solid state.

Finally the salt can be admixed to the polyester batch prior to or during the polycondensation when care is taken by conducting the reaction in a suitable manner that the subsequent polycondensation in the melt lasts for a period of less than 4 hours.

Polyethylene terephthalate is preferably used as the linear saturated polyester of aromatic dicarboxylic acids. However, there may also be used other polyesters, for example polycyclohexane-1,4-dimethylol-terephthalate.

There may also be used modified polyethylene terephthalates which contain, in addition to terephthalic acid, still other aromatic or aliphatic dicarboxylic acids as structural units, for example isophthalic acid, naphthalene-2,6-dicarboxylic acid or adipic acid. Furthermore there may be used modified polyethylene terephthalates containing, in addition to ethylene glycol, still other aliphatic diols such, for example, as neopentyl glycol or butanediol-1,4 as the alcoholic component. Polyesters of hydroxycarboxylic acids may likewise be used.

The polyester mass should contain as small as possible an amount of moisture, preferably less than 0.01% by weight.

To diminish the absorption of moisture, the granulated polyester molding composition may be coated with an inert hydrophobic substance such, for example, as paraffin or wax.

Such waxes also serve to improve the flow properties, i.e. they influence the rheological behavior.

The removability from the mold of the finished molded articles can, if necessary, additionally be improved by adding special additives to the finished polyester granules. There may be mentioned, for example, neutral or partly neutralized salts of montan waxes or montan ester waxes, furthermore alkali metal paraffin sulfonates and alkali metal olefin sulfonates.

In order to improve the impact strength, suitable high-polymers may be admixed to the polyesters in known manner such, for example, as copolymers of ethylene with vinyl acetate, ethylene with acrylic ester or butadiene with styrene.

The polyester portion of the finished molding composition should have a reduced specific viscosity within the range of from 0.9 to 2.0 dl./g., preferably within the range of from 1.0 to 1.6 dl./g. (measured in a solution of 1 gram polyester in 100 ml. of a mixture of phenol and tetrachloroethane in a ratio by weight of 3:2 at 25° C.). When the reduced specific viscosity of the polyester portion in the molding composition is too low, the molding composition can be subjected to a post-condensation in the solid phase according to known methods. When the molding composition is obtained by homogenizing in the extruder, it is advisable, when choosing the basic polyester, to take into consideration a possible degradation of the polyester and a decrease of the reduced specific viscosity resulting therefrom.

To obtain injection-molded articles having a satisfactory degree of crystallization, it is advantageous to maintain the temperature of the mold at a level sufficiently above the second order transition temperature. When polyester molding compositions based on a modified polyethylene terephthalate are used, mold temperatures ranging from 120° to 160° C. are preferably applied.

The molding compositions according to the invention enable the manufacture of high-quality molded articles of high dimensional stability such, for example, as gears, bevel gears, racks, clutch disks or guide elements.

The examples following hereunder illustrate the invention:

EXAMPLE 1

10 kg. of polyethylene terephthalate granules having a grain size of 2.5 mm., a reduced specific viscosity of 1.45 dl./g. (measured at 25° C. in a solution of 1 g. polyester in 100 ml. of a mixture of phenol and 1,1,2,2-tetrachloroethane in a ratio by weight of 3:2) and a water content of less than 0.005%, were mixed with 6 grams (0.06% by weight) of the disodium salt of 1,10-decanedicarboxylic acid for a period of 12 hours in a mixer which was impervious to moisture. The granules which had been treated in this manner were injection-molded in an injection-machine into sheets of dimensions 60 x 60 x 2 mm., the mold temperature being 140° C. The mean density of the sheets so obtained in dependence on the residence time in the mold adjusted in each case is indicated in the table following hereunder.

TABLE 1

| Residence time in the mold (seconds): | Density (g./cc.) |
| --- | --- |
| 15 | 1,371 |
| 30 | 1,373 |
| 45 | 1,373 |
| 60 | 1,373 |
| 75 | 1,374 |

For the purpose of comparison, Table 2 indicates the values of two products which had been worked up under the same conditions, the sodium salt being replaced by 0.1% by weight of finely ground calcium carbonate in the one case and by 0.1% by weight of finely ground magnesium oxide in the other case.

TABLE 2

| Residence time in the mold (seconds) | 15 | 30 | 45 | 60 | 75 |
| --- | --- | --- | --- | --- | --- |
| Density (g./cc.) calcium carbonate | 1.359 | 1.362 | 1.364 | 1.366 | 1.370 |
| Density (g./cc.) magnesium oxide | 1.361 | 1.364 | 1.367 | 1.369 | 1.371 |

It can be seen from the table that densities of 1,370 could be obtained only after residence times in the mold of more than one minute.

EXAMPLE 2

20 kg. of polyethylene terephthalate granules having a grain size of 2.5 mm. and a reduced specific viscosity of 1.52 dl./g. were mixed with 14 grams (0.07% by weight) of the disodium salt of 1,10-decanedicarboxylic acid for a period of 12 hours in a mixer which was impervious to moisture. The granules so treated were melted in an extruder at 275° C., homogenized, extruded into water in the form of a strand and granulated. The moist granules were dried in an eccentric tumbling drier under 0.2 mm. Hg pressure for a period of 2 hours at 100° C. and for a period of 3 hours at 180° C., and crystallized.

The material so obtained had a reduced specific viscosity of 1.42 dl./g. and was injection-molded into sheets of dimensions 60 x 60 x 2 mm. in the manner as described in Example 1. Table 3 indicates the densities obtained.

TABLE 3

| Residence time in the mold (seconds): | Density (g./cc.) |
| --- | --- |
| 15 | 1,370 |
| 30 | 1,372 |
| 45 | 1,372 |
| 60 | 1,372 |
| 75 | 1,373 |

EXAMPLE 3

10 kg. of dimethyl terephthalate were reesterified in known manner with 8.8 kg. of ethylene glycol in the presence of a commercial reesterification catalyst. 10 kg. of the disodium salt of 1,10-decanedicarboxylic acid, suspended together with the condensation catalyst (for example $Sb_2O_3$ or $GeO_2$) in 200 ml. of glycol, were added to the reesterification melt. The condensation to yield the finished polyester was conducted in known manner. After a condensation period of 3½ hours at 285° C. (under 0.07 mm. Hg pressure), the polyester had attained a reduced specific viscosity of 0.85 dl./g. The melt was discharged into ice water and granulated. The dried material was subjected to post-condensation in an eccentric tumbling drier for a period of 8 hours at 240° C. under 0.2 mm. Hg pressure to a reduced specific viscosity of 1.45 dl./g.

The work-up into test sheets was carried out in a manner analogous to that of Examples 1 and 2. The densities are indicated in Table 4.

TABLE 4

| Residence time in the mold (seconds): | Density (g./cc.) |
| --- | --- |
| 15 | 1,368 |
| 30 | 1,370 |
| 45 | 1,371 |
| 60 | 1,371 |
| 75 | 1,372 |

EXAMPLE 4

The process was carried out in a manner analogous to that of Example 1, except that instead of the sodium salt of 1,10-decanedicarboxylic acid disodium adipate (0.05% by weight) was used. Even with low residence times in the mold, the injection-molded sheets exhibited densities above 1,370.

What is claimed is:

1. A shaped, injection molded article consisting essentially of a mixture
   (a) of a linear saturated polyester of an aromatic dicarboxylic acid and a saturated aliphatic or cycloaliphatic diol, and
   (b) from 0.005 to 3% by weight, calculated on the weight of the polyester, of a lithium and/or sodium salt of a polycarboxylic acid, the particle size of the salt of the polycarboxylic acid being less than 10 microns.

2. A shaped, injection molded article as defined in claim 1, wherein the linear saturated polyester additionally contains up to 5% by weight, calculated on the weight of the polyester, of an aliphatic dicarboxylic acid.

3. A shaped, injection molded article as defined in claim 1, wherein the linear saturated polyester is polyethylene terephthalate.

4. A shaped, injection molded article as defined in claim 1, wherein the linear saturated polyester is polycyclohexane-1,4-dimethylol terephthalate.

5. A shaped, injection molded article as defined in claim 1, wherein the linear saturated polyester is a modified polyethylene terephthalate containing, in addition to terephthalic acid, units derived from an acid selected from the group consisting of isophthalic acid, naphthalene-2,6-dicarboxylic acid and adipic acid.

6. A shaped, injection molded article as defined in claim 1, wherein the linear saturated polyester is a modified polyester which contains as the alcoholic component, in addition to ethylene glycol, units derived from neopentyl glycol or butane-1,4-diol.

7. A shaped, injection molded article as defined in claim 1, wherein the polyester has a reduced specific viscosity in the range of from 0.9 to 2.0 dl./g. (measured in a solution of 1 g. polyester in 100 ml. of a mixture of phenol/tetrachloroethane in a ratio by weight of 3:2 at 25° C.).

8. A shaped, injection molded article as defined in claim 1, wherein the polyester has a reduced specific viscosity in the range of from 1.0 to 1.6 dl./g. (measured in a solution of 1 g. polyester in 100 ml. of a mixture of phenol/tetrachloroethane in a ratio by weight of 3:2 at 25° C.).

9. A shaped, injection molded article as defined in claim 1, wherein the salt of the carboxylic acid is used in an amount within the range of from 0.02 to 0.5% by weight, calculated on the weight of the polyester.

10. A shaped, injection molded article as defined in claim 1, wherein the sodium or lithium salt is the salt of at least one acid selected from the group consisting of succinic acid, adipic acid, suberic acid, 1,10-decanedicarboxylic acid, 1,4-cyclohexanedicarboxylic acid, terephthalic acid, 1,2,3-propanetricarboxylic acid, 1,3,5-cyclohexane-tricarboxylic acid, trimellitic acid, 1,2,3,4-cyclopentane-tetracarboxylic acid and pyromellitic acid.

References Cited
UNITED STATES PATENTS

| | | |
|---|---|---|
| 3,024,220 | 3/1962 | Cramer. |
| 3,567,693 | 3/1971 | Piirma. |
| 3,575,931 | 4/1971 | Sherman. |
| 3,624,041 | 11/1971 | Brandrup et al. |

FOREIGN PATENTS

| | | |
|---|---|---|
| 782,036 | 8/1957 | Great Britain. |

MELVIN GOLDSTEIN, Primary Examiner

U.S. Cl. X.R.

260—75 B; 264—328